(12) United States Patent
Van Haecke

(10) Patent No.: US 10,427,666 B1
(45) Date of Patent: Oct. 1, 2019

(54) BRAKE INSTALLATION MEASUREMENT AND VERIFICATION SYSTEM

(71) Applicant: Leonard Van Haecke, Wills Point, TX (US)

(72) Inventor: Leonard Van Haecke, Wills Point, TX (US)

( * ) Notice: Subject to any disclaimer, the term of this patent is extended or adjusted under 35 U.S.C. 154(b) by 0 days.

(21) Appl. No.: 16/274,787

(22) Filed: Feb. 13, 2019

(51) Int. Cl.
*G01B 5/02* (2006.01)
*B60T 17/22* (2006.01)
*G01B 5/00* (2006.01)

(52) U.S. Cl.
CPC .......... *B60T 17/221* (2013.01); *G01B 5/0028* (2013.01)

(58) Field of Classification Search
CPC ............................ B60T 17/221; G01B 5/0028
USPC ................................. 33/609, 1 BB, 600, 562
See application file for complete search history.

(56) References Cited

U.S. PATENT DOCUMENTS

| | | | | |
|---|---|---|---|---|
| 337,224 | A * | 3/1886 | Albert ...................... | G01B 3/30 33/562 |
| 1,389,486 | A * | 8/1921 | Brewer ..................... | G01B 3/34 33/562 |
| 3,724,085 | A * | 4/1973 | Wentworth .............. | A47H 1/10 248/544 |
| 4,208,798 | A | 6/1980 | Sampson | |
| 5,131,163 | A | 7/1992 | Crewson et al. | |
| 5,181,440 | A * | 1/1993 | Jagt ..................... | B25B 27/0035 188/1.11 R |
| 5,244,061 | A * | 9/1993 | Hoyt ...................... | B60T 17/221 188/1.11 W |
| 5,507,100 | A | 4/1996 | Magnet et al. | |
| 6,935,039 | B1 * | 8/2005 | Hess ....................... | D05B 97/12 33/1 B |
| 7,040,151 | B2 * | 5/2006 | Graham ............... | G01B 5/0028 33/600 |
| 7,073,267 | B2 * | 7/2006 | Butler ...................... | G01B 3/20 33/203 |
| 7,845,091 | B2 * | 12/2010 | Clark ...................... | G01B 3/20 33/609 |
| 2010/0037476 | A1 * | 2/2010 | Grantham ............. | B60T 17/221 33/609 |
| 2013/0047454 | A1 * | 2/2013 | Long ........................ | G01B 3/04 33/600 |
| 2015/0041260 | A1 * | 2/2015 | Plantan ................... | B60T 13/36 188/106 F |
| 2016/0186828 | A1 * | 6/2016 | Goncalves ............ | F16D 66/028 188/1.11 W |

\* cited by examiner

*Primary Examiner* — Christopher W Fulton
(74) *Attorney, Agent, or Firm* — Dale J. Ream

(57) ABSTRACT

A pushrod measurement and verification system for determining a cutback length at which to sever a pushrod extending from a brake chamber so that a slack adjuster is properly mounted in an air brake system. The system includes a measurement member having a body member that includes opposed lower and upper ends, the body member having a thin and planar configuration. The body member defines a plurality of holes adjacent the lower end corresponding to sizes of the slack adjuster to be installed. The measurement member includes a cradle portion mounted to the upper end of the body member, the cradle portion having a bottom wall and a pair of side walls extending upwardly from the bottom wall and defining an open top, the cradle portion configured to cradle a pushrod. A front surface of the cradle portion includes measurement indicia for determining a cutback length of the pushrod.

20 Claims, 13 Drawing Sheets

BRAKE INSTALLATION MEASUREMENT AND VERIFICATION SYSTEM

BACKGROUND OF THE INVENTION

This invention relates generally to air brakes for heavy equipment and, more particularly, to a system having at least measurement and verification tools for determining a proper length at which to cut a pushrod for proper setup of a brake replacement procedure.

Heavy equipment, including semi-trucks, typically include air brakes as the primary means for stopping rotation of its wheels. An air brake system is a complex mechanical assembly and must be kept in good working condition and in proper alignment with all of the air brake components of the truck to avoid component failure and potential injury and cost. More particularly, the pushrods within a brake assembly should be cut to a specific length to work efficiently with the slack adjusters and, thereafter, the S-cams that actually cause a braking action. If the brake geometry is out of a predetermined range, vehicle performance may be affected and the components of the assembly may be shortened. Proper brake geometry is critical as out of adjustment brakes can cause the vehicle to be taken out of service by law enforcement or, worse yet, lead to a traffic accident.

Specifically, repair technicians sometimes make crucial errors when setting up the geometry of a brake system. For instance, the brakes may instantly and unexpectedly lock up if a pushrod is cut too long or the brakes may not work at all if the pushrod is cut too short. Technicians often just "eyeball" the proper pushrod length which can lead to disaster on the highway when trying to stop a truck weighing 80,000 pounds.

Manufacturers of brake assemblies provide guidance by way of charts and template inserts in an effort to assist automotive technicians to properly configure a brake installation. Although presumably effective for their intended purposes, the existing devices and methods for installing and configuring components of a brake assembly coupled to and associated with a pushrod remain confusing and prone to error. The process is made even more difficult for a technician lying underneath a truck.

Therefore, it would be desirable to have a pushrod measurement and verification system having a measurement tool that indicates the cutback length of a pushrod associated with a brake assembly. Further, it would be desirable to have a pushrod measurement and verification system that may be mounted to the S-cam spline of a brake assembly in the same manner as a slack adjuster will eventually be attached and, as a result, indicate an exact location that the pushrod should be cut. In addition, it would be desirable to have a pushrod measurement and verification system, having a verification tool that shows quickly if a clevis and slack adjuster have been installed properly (i.e. attached to a correctly sized push rod).

SUMMARY OF THE INVENTION

A pushrod measurement and verification system according to the present invention is used in determining a correct length at which to sever a pushrod extending from a brake chamber so that a slack adjuster is properly mounted between a clevis and an S-cam shaft of an air brake system. The system includes a measurement member having a body member that includes a lower end and an upper end, the body member having a generally planar configuration. The body member defines a plurality of holes adjacent the lower end corresponding to sizes of the slack adjuster to be installed later. The measurement member includes a cradle portion mounted to the upper end of the body member, the cradle portion having a bottom wall and a pair of side walls extending upwardly from the bottom wall and defining an open top. A front surface of the cradle portion includes measurement indicia for determining a cutback length of the pushrod.

Therefore, a general object of this invention is to provide a pushrod measurement and verification system that enables an automotive technician to properly determine an optimal cutback length and position at which to cut or sever a pushrod that extends away from a brake chamber;

Another object of this invention is to provide a pushrod measurement and verification system, as aforesaid, to verify and confirm that a completed brake assembly replacement was properly installed and properly aligned.

Still another object of this invention is to provide a pushrod measurement and verification system, as aforesaid, that provides measurement and verification tools that remove the guesswork of the complex job of replacing brake assemblies on semi-trucks.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
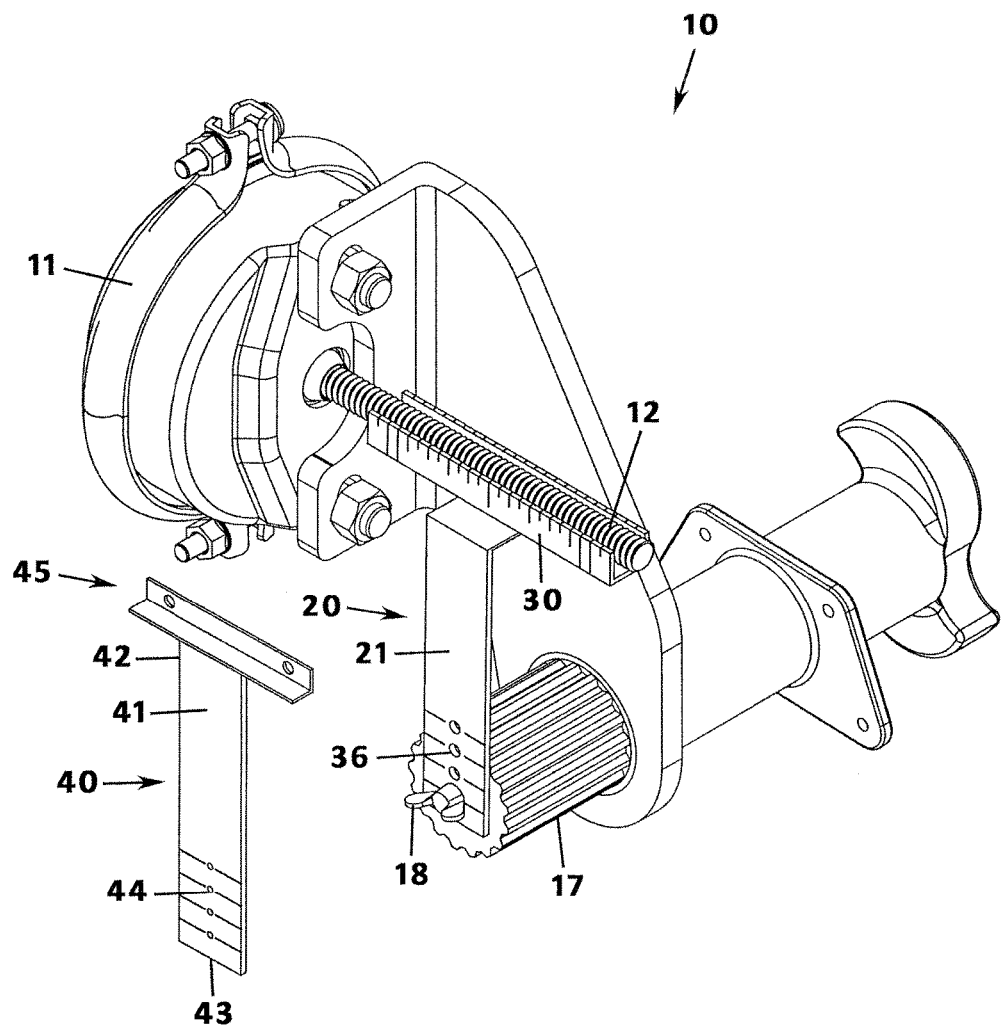
FIG. 1 is a perspective view of pushrod measurement and verification system according to a preferred embodiment of the present invention.
Figure 2:
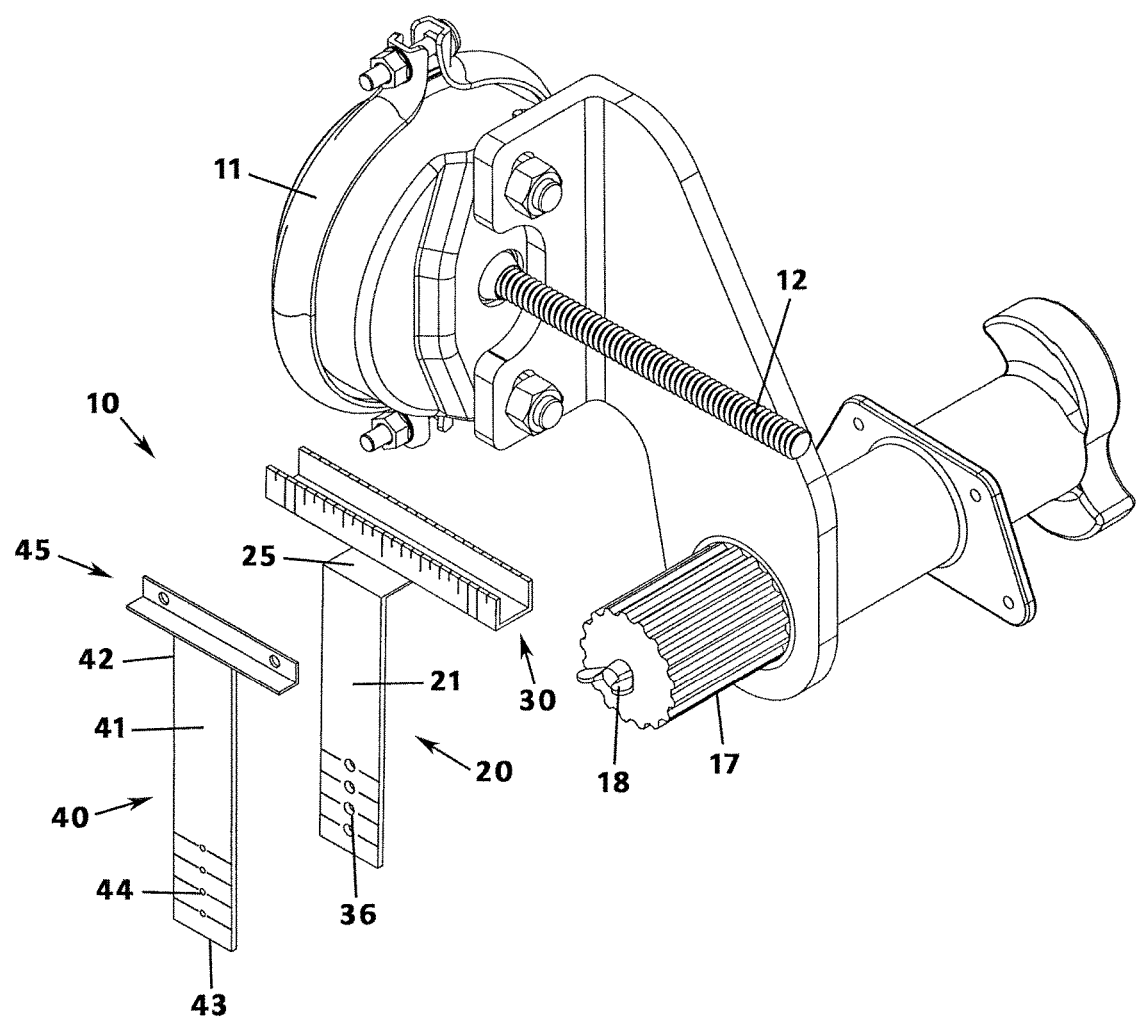
FIG. 2 is an exploded view of the system as in FIG. 1.
Figure 3:
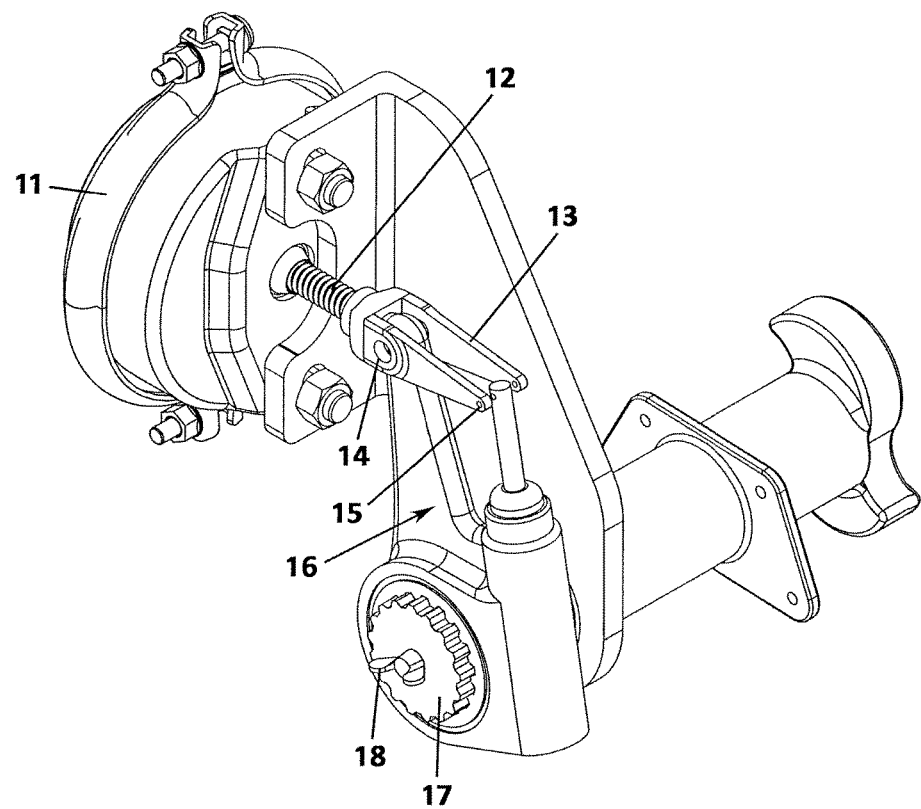
FIG. 3 is another perspective view of the system as in FIG. 1 illustrating a brake assembly after cutting back the pushrod and removal of the measurement member.

A pushrod measurement and verification system will now be described with reference to FIGS. 1 to 13 of the accompanying drawings. The pushrod measurement and verification system 10 includes a measurement member 20 and a verification member 40 for use in a method of measuring, marking, and cutting a pushrod 12 of an air brake assembly.

The accompanying drawings are best understood with an understanding of an air braking system with which the present invention is associated. Air brakes are typically used on heavy equipment and, more particularly, on semi-trucks for selectively allowing or stopping the truck's wheels from rotating. Specifically, an S-cam braking system is utilized and will be referenced herein. In a generalized explanation of an air-brake assembly, when a driver presses on a brake pedal inside the cab of the truck, air may be pushed into a brake chamber 11 causing an outward linear movement of a pushrod 12. The pushrod 12 may be coupled to a clevis 13 which is subsequently coupled to a slack adjuster 16, the clevis 13 being the link that may, at one end, be threadably mounted to a threaded pushrod 12 and at an opposite end be coupled to a slack adjuster 16, such as with a clevis pin. The slack adjuster 16 extends between the clevis 13 and an S-cam spline 17, the slack adjuster 16 being the link or structure that changes the linear motion of the pushrod 12 being pushed outwardly into rotational motion. The S-cam is a shaft that moves rotationally to either allow the truck's tires to rotate or to stop them from rotational movement, i.e. by engaging a brake drum and pads. (A "spline" in the mechanical context refers to ridges or teeth positioned on a rotatable shaft and configured to transfer torque to the shaft). Stopping a heavy semi-truck requires all of the movements described above to be coordinated and in proper alignment. The proper geometry of a brake assembly is critical and is dependent upon a push rod having a correct length.

The measurement member 20 (also referred to as a measurement tool) includes a body member 21 having an elongate and generally planar or flat configuration. The body member 21 may include a primary portion 22 having an upper end 23 and an opposed lower end 24 and defining a flat surface therebetween. Further, the body member 21 may include a bridge portion 25 coupled to the upper end 23 and extending away from the primary portion 22 at a perpendicular or rearward angle therefrom. In other words the bridge portion 25 provides an offset to the otherwise linear configuration of the body member 21 of the measurement member 20 (FIG. 6).

Figure 6:
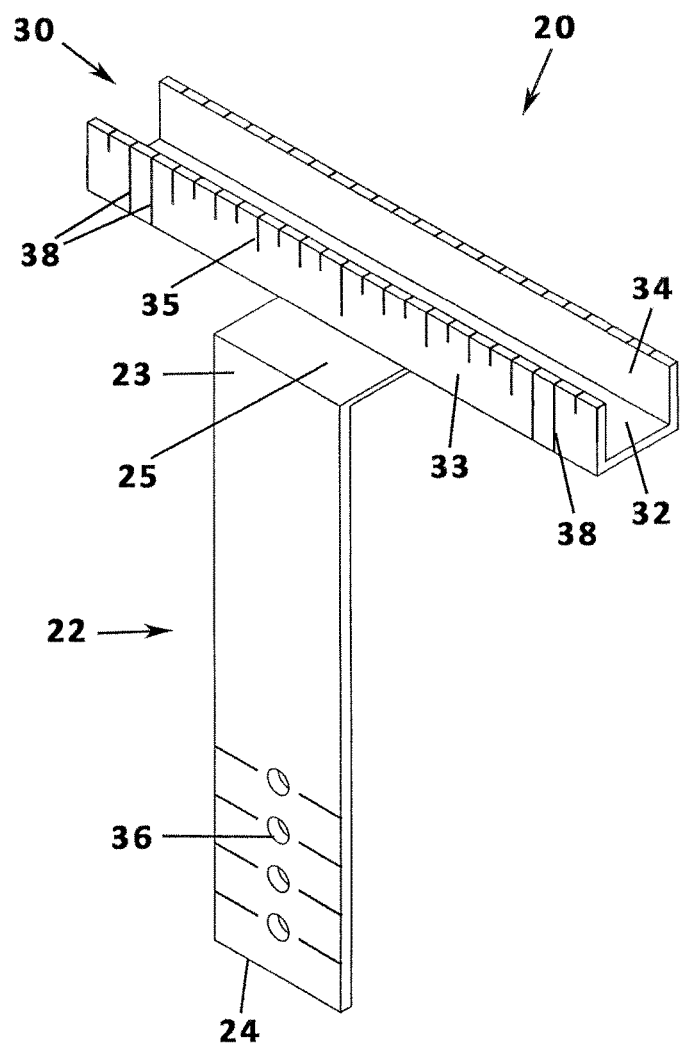
FIG. 6 is a perspective view of the measurement member removed from the brake assembly of FIG. 1.
Figure 7:
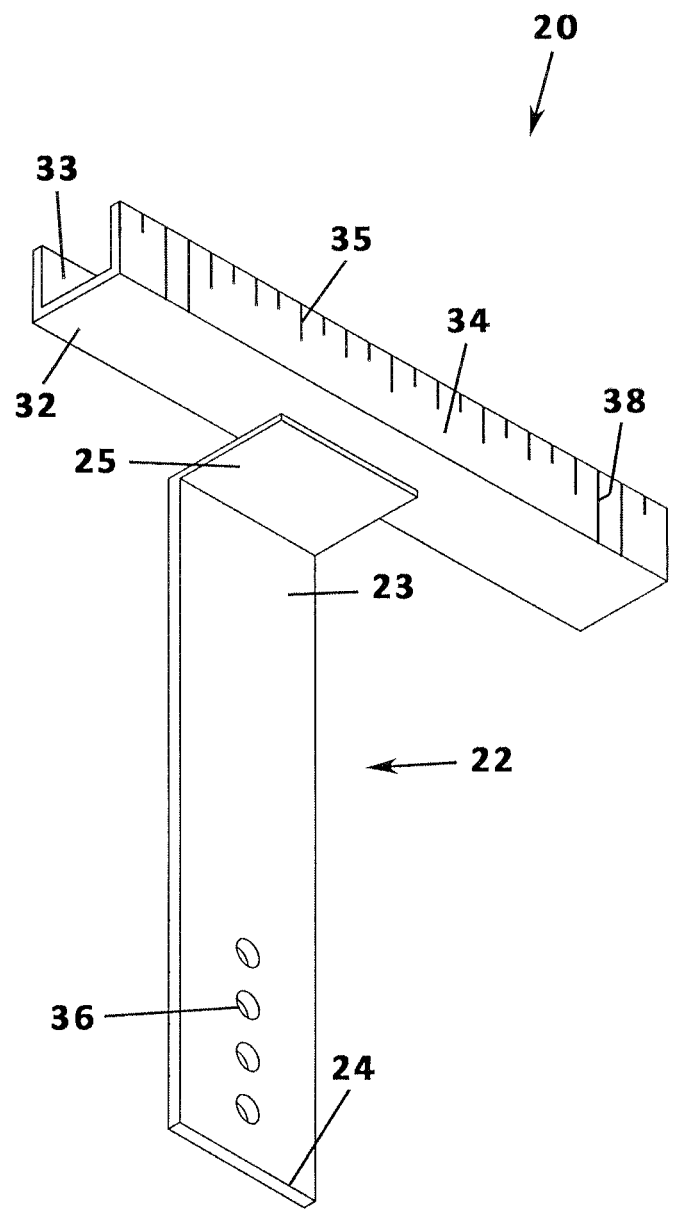
FIG. 7 is an underneath perspective view of the measurement member as in FIG. 6
Figure 8:
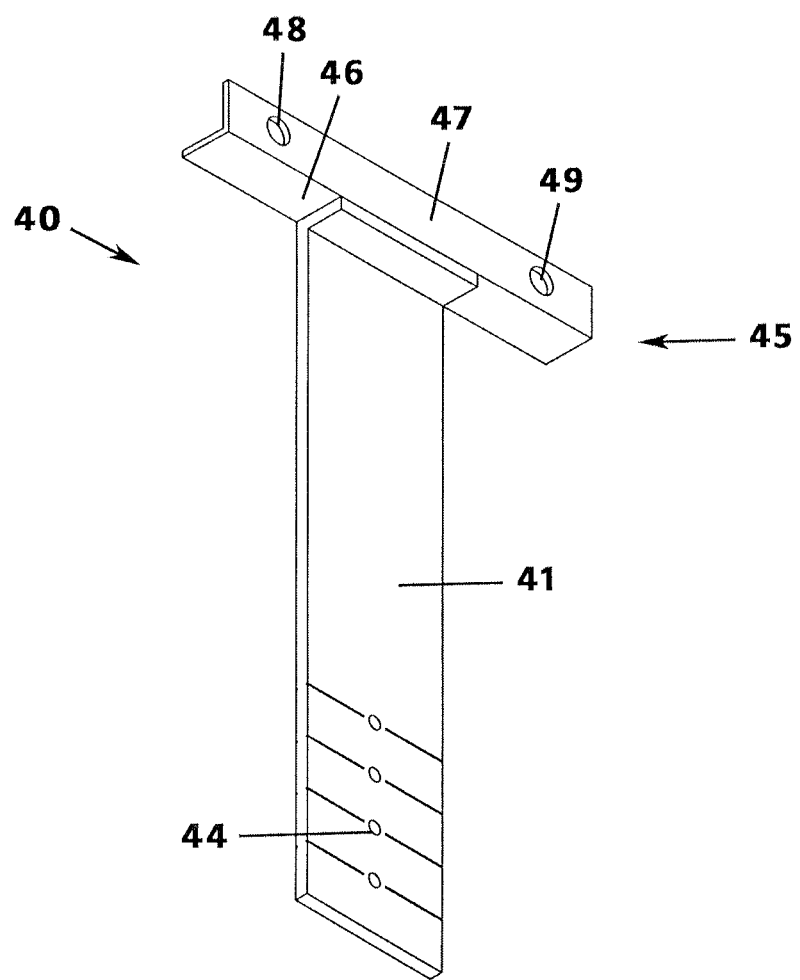
FIG. 8 is a perspective view of the verification member removed from the brake assembly of FIG. 1.
Figure 9:
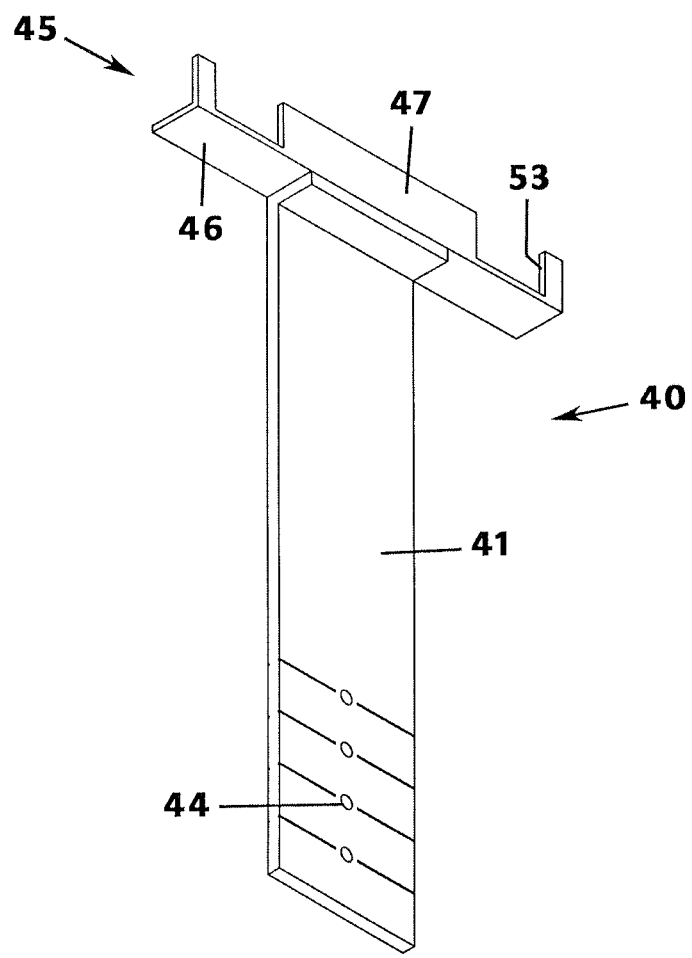
FIG. 9 is a perspective view of a verification member removed from the brake assembly of FIG. 1 and illustrated in an alternative form.
Figure 10:
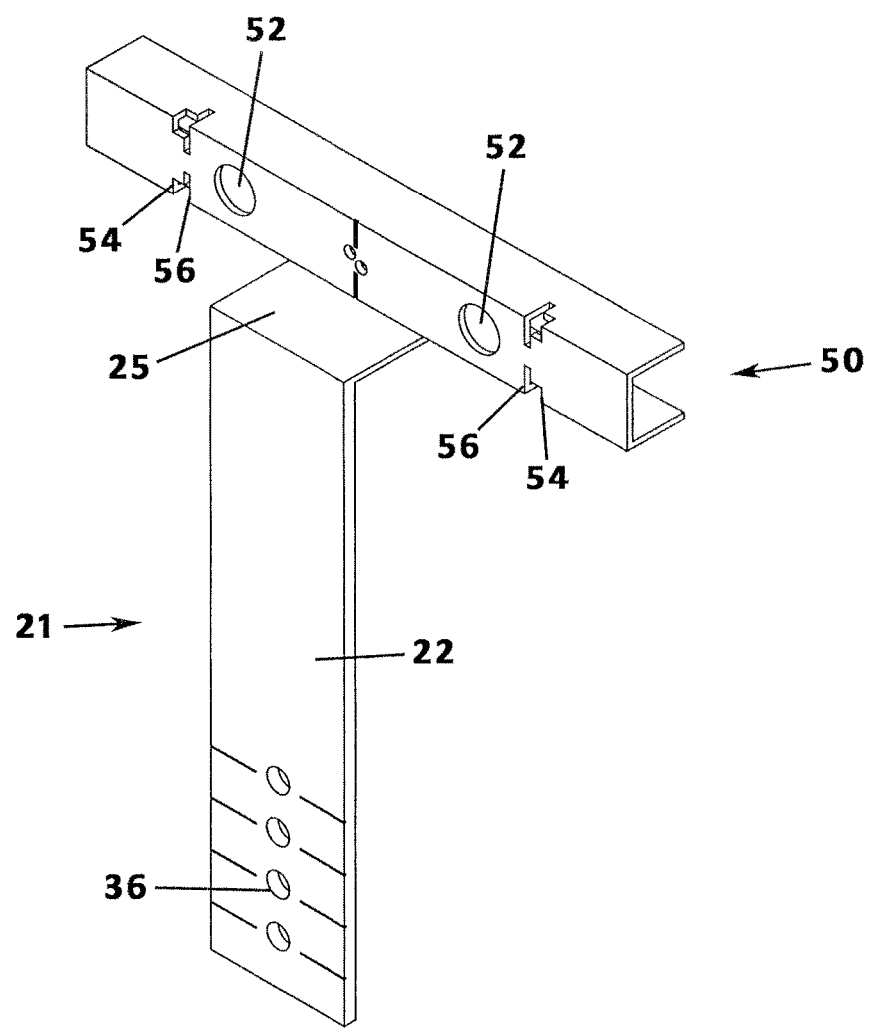
FIG. 10 is a front perspective view of a clevis alignment tool according to the present invention.

The measurement member 20 includes a cradle portion 30 mounted atop the body member 21 (FIG. 6). More particularly, the cradle portion 30 is operably connected to the upper end 23 of the body member 21 or, even more particularly, to the bridge portion 25. The cradle portion 30 includes a bottom wall 32 and a pair of side walls extending upwardly from the bottom wall 32, the side walls being parallel and displaced from one another so as to define an open top. Preferably, the bottom wall 32 of the cradle portion 30 and an upper surface of the bridge portion 25 are co-planar. The cradle portion 30 has an elongate configuration extending laterally or side-to-side relative to the primary portion 22 of the body member 21. Stated another way, an imaginary longitudinal axis (i.e. a horizontal axis) defined by the cradle portion 30 is perpendicular to a longitudinal axis (i.e. a vertical axis) defined by the primary portion 22 of the body member 21.

The pair of side walls of the cradle portion 30 includes a front wall 33 and a rear wall 34. An outer surface of at least the front wall 33 includes indicia in the form of measurement markings 35, i.e. the markings distributed like a ruler or tape measure and may use numerical measurement indicia. The measurement markings 35 may be used in identifying a proper cutback length for a pushrod 12 as will be described in more detail later. Preferably, the cradle portion 30 extends an equal length in lateral directions transverse to the primary portion 22 of the body member 21 and defines a span larger than a width of the body member 21. Numerical indicia and marking are included both to the left and to the right in that the measurement tool 10 will be used in installing brakes on both the left side and right side of a truck.

The primary portion 22 of the body member 21 defines a plurality of holes 36 proximate the lower end 24 and arranged in a spaced apart vertical or upstanding pattern. The plurality of holes 36 is preferably centered between side edges of the primary portion 22 and may be referred to as "center pin holes." In other words, the holes 36 are spaced apart in a manner corresponding to the common sizes of slack adjusters 16 which may be used in completing a brake assembly process. The diameter of each hole 24 is complementary to an S-cam pin 18 that mates into a hole in an S-cam spline (or, to a flange extending from the S-cam spline). In other words, each hole 36 is capable of being mounted to the S-cam spline by the respective hole receiving the pin 18 therethrough (or by receiving a pin therethrough).

With further reference to the plurality of holes 36, the holes correspond to different sizes of slack adjusters, namely, to slack adjusters having lengths of 5, 5½, 6, and 6½ inches, respectively. Slack adjusters having different lengths are possible but are not as common. Text indicia (not shown) may be positioned on the primary portion 22 adjacent respective holes 36 to indicate which hole corresponds to which size (length) of slack adjuster. In use, a technician would choose the hole 36 corresponding to the size and type of slack adjuster 16 to be used in a brake setup and couple the selected hole to the S-cam spline with the cradle portion 30 being displaced therefrom and is positioned into a cradled or nested relationship with the pushrod 12. With the measuring tool 20 mounted at a 90 degree angle relative to the pushrod 12, the exact point to cut the pushrod can be marked with precision. Additional cut marks 38 indicating minimum and maximum pushrod lengths may also be marked on a wall of the cradle portion 30 to indicate the minimum or maximum variance that may be allowed (which is usually only about 10%). It should be appreciated that if a brake chamber bracket is bent, the pushrod 12 will not seat properly in the cradle portion 30 and should be investigated or replaced.

In another aspect, the pushrod measurement and verification system 10 includes a verification member 40 (also referred to as a verification tool). The verification member 40 has a construction substantially similar to a construction of the measurement member 20 described above except as noted below. Most notably, the verification member 40 does not include a bridge offset and includes an alignment portion 45 in lieu of the cradle portion 30, More particularly, the verification member 40 includes a handle 41 having a flat or planar configuration and having opposed upper and lower ends 42, 43 in a manner similar to the primary portion 22 of the body member 21 of the measurement member 20 described above. Likewise, the handle 41 defines a plurality of pin holes 44 corresponding to slack adjuster sizes as described above. The alignment portion 45 is coupled to the upper end 42 of the handle 41 and includes a bottom wall 46, and a rear wall 47 extending upwardly from the bottom wall 46. The alignment portion 45 has an elongate configuration extending laterally relative to the axis of the handle 41 and may have the configuration of an L-shaped bracket. The rear wall 47 of the alignment portion 45 defines a first alignment aperture 48 and a second alignment aperture 49.

Figure 4:
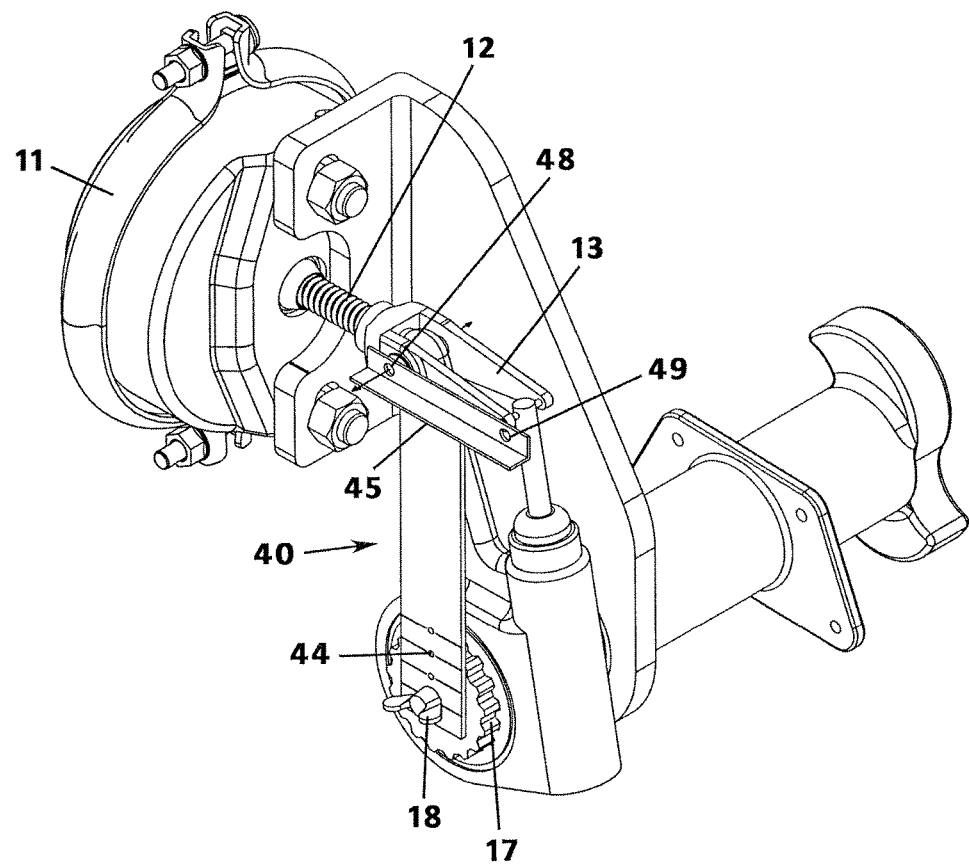
FIG. 4 is another perspective view of the system as in FIG. 3 illustrated in use with a verification member according to the present invention.
Figure 5:
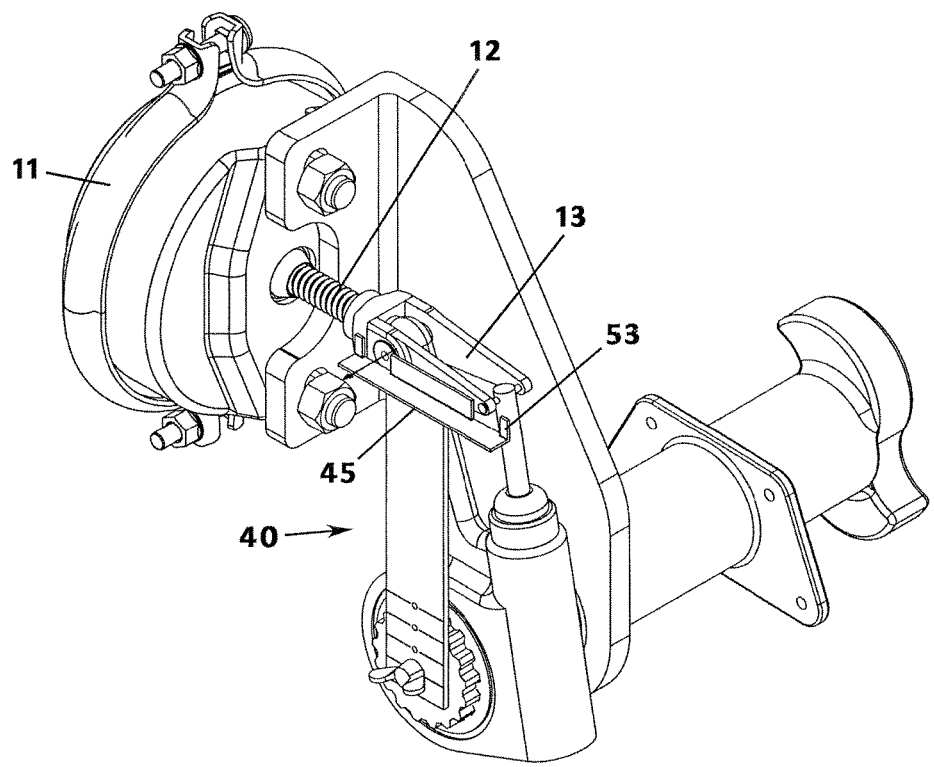
FIG. 5 is a perspective view of the system as in FIG. 4, illustrated in use with an alternative embodiment of a verification member.

The alignment portion 45 is useful to determine if the pushrod 12 has been severed at a correct length corresponding to the selected slack adjuster 16 and this confirmation is made according to alignment of the pair of alignment apertures 48, 49 and corresponding apertures defined by the attachments between a clevis 13 and slack adjuster 16 (FIG. 4). For instance, when a pushrod 12 has been measured using the measurement member 20 and the pushrod 12 has, in fact, been cut, a clevis 13 is threadably coupled to the remaining pushrod 12. The clevis 13 may include a first aperture 14 proximate the clevis throat and a second aperture 15 adjacent a free end of the clevis 13, the slack adjuster 16 being attached to respective clevis apertures such as with clevis pins. In use, a technician aligns an appropriate pin hole 44 with the S-cam spline according to an associated slack adjuster 16 that was used. Then, with the handle 41 in an upright (completely 90 degrees and vertical orientation), the alignment portion 45 should line up with a side of the clevis 13. Further, the technician can quickly confirm that the first and second alignment apertures 48, 49 register with (i.e. are in alignment with) the first and second apertures 14, 15 of the clevis, respectively (FIG. 4). In another embodiment shown in FIGS. 5 and 9, a respective alignment aperture 48, 49 described above may be formed into a single opening 53 for aligning with a clevis aperture and also for use in determining a pushrod cutback length.

Figure 13:
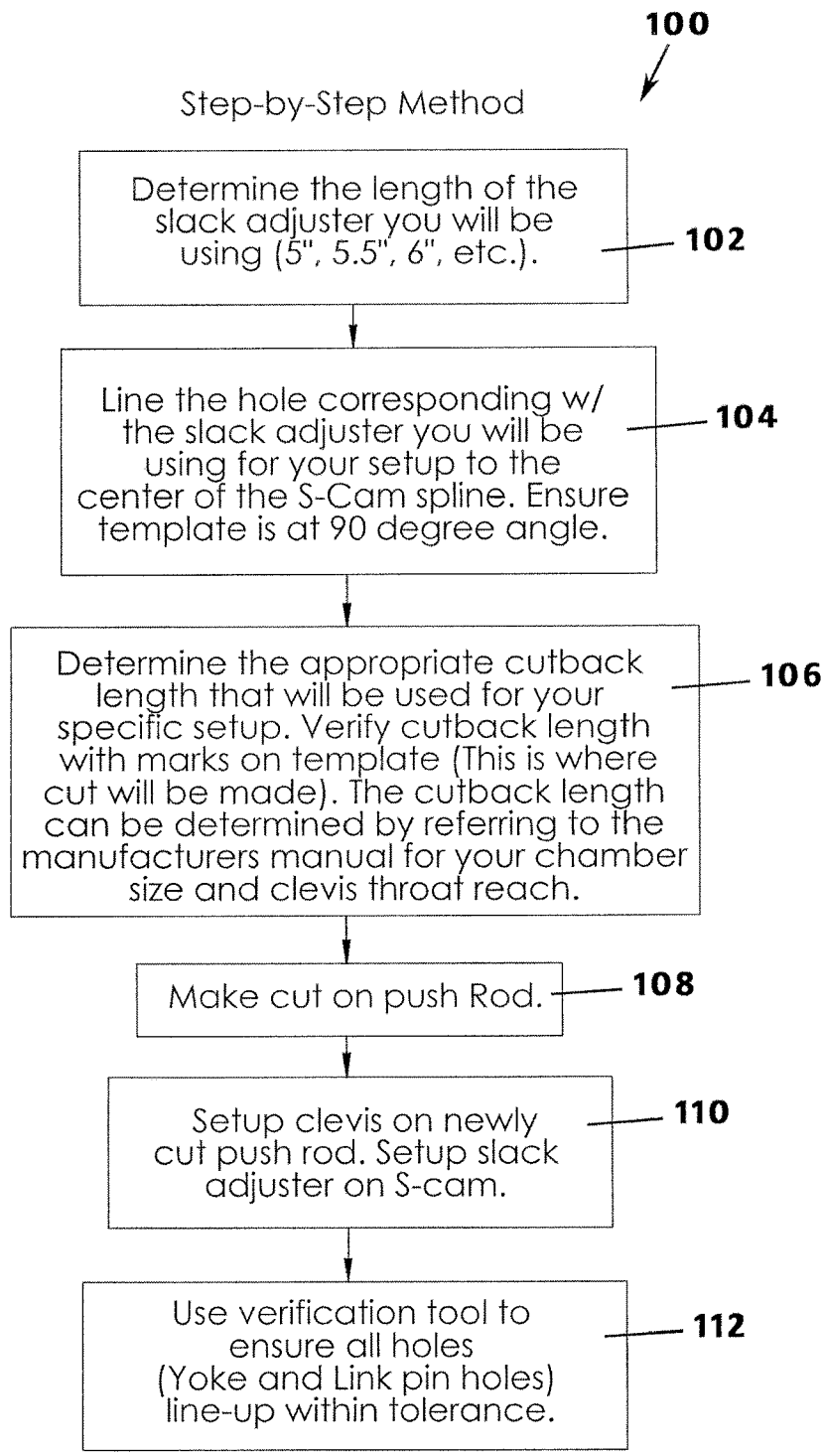
FIG. 13 is a flowchart illustrating a preferred methodology for determining and verifying a cutback length of a braking system according to the present invention.

FIG. 13 is an illustration of an exemplary methodology 100 of how to use the pushrod measurement and verification system 10 to determine a correct length at which to sever a pushrod 12 so that the geometry of a brake replacement assembly can be installed and then verified. Ensuring that the geometry of a brake assembly is correct is to make sure a slack adjuster 16 corresponds to a length of a pushrod 12. Therefore, the size (length) of a slack adjuster to be used should be selected, as indicated at step 102. Then, the measurement member 20 may be physically attached to the brake assembly. Specifically, a hole defined by the body member 21 corresponding to the specific slack adjustor to be used is coupled to the S-cam spline 17 as indicated at step 104. To work accurately, care must be taken that the measurement member 20 is rotated (if necessary) to a vertical orientation (i.e. perpendicular to an axis defined by the pushrod 12. In this orientation, the pushrod 12 will be nested in the cradle portion 30 of the measurement member 20.

The next step, shown at step 106, involves using the indicia on the face of the cradle portion 30 to determine the cutback length of the pushrod 12, i.e. to determine where to sever the pushrod 12. The method 100 proceeds to step 108 where a user actually cuts the pushrod 12 to the marked length as determined using the measurement tool. With the pushrod 12 cut to the proper length corresponding to the selected slack adjustor, the brake assembly process can proceed. Specifically, the throat-end of a clevis 13 may be rotatably coupled to the remaining portion of the pushrod 12 (which is threaded) and the selected slack adjuster 16 may be coupled to the clevis 13, such as with clevis pins, as indicated at step 110.

Finally, the verification member 40 may be used to confirm that the geometry of the pushrod 12, clevis 13, and slack adjuster 16 are correct or at least within a predetermined tolerance of acceptability, as indicated at step 112. Preferably, the step of verification is always performed by a technician at the time of brake setup. However, it may be performed by managers of technicians, by law enforcement, or by other parties with an interest in the safe and efficient operation of the truck or fleet of trucks.

Figure 11:
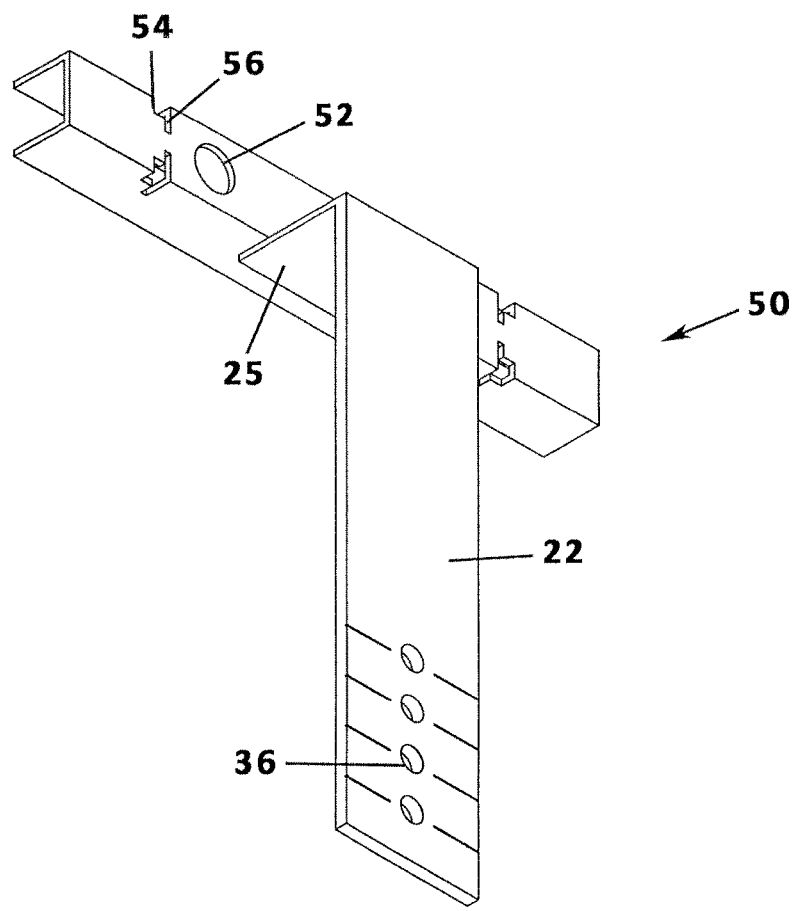
FIG. 11 is a rear perspective view of the clevis alignment tool as in FIG. 10.
Figure 12:
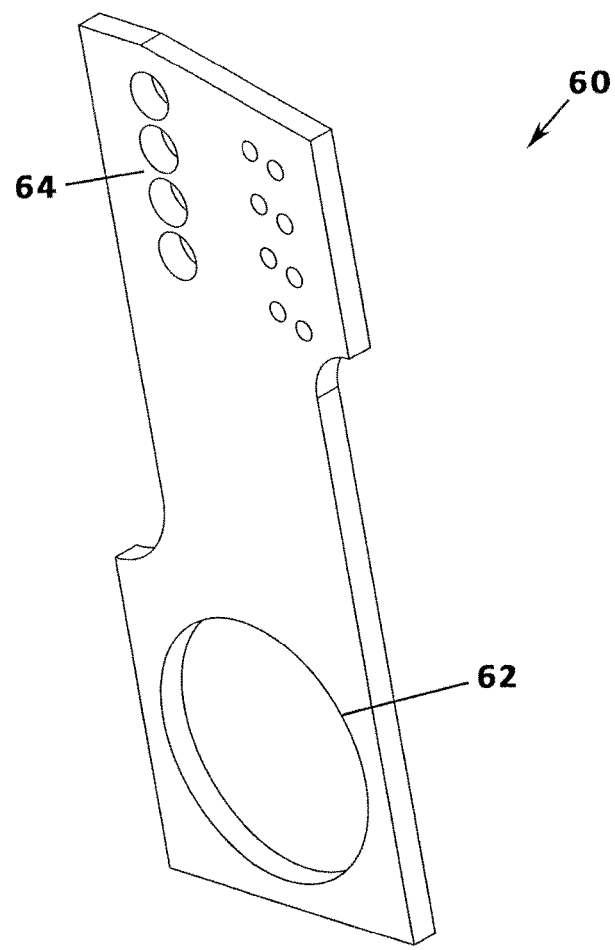
FIG. 12 is a front perspective view of a slack adjuster alignment tool according to the present invention.

Additionally, the present invention may include a clevis alignment tool 50 (FIG. 10) and a slack adjuster alignment tool 60 (FIG. 12) to simplify determining the cutback position for cutting a pushrod 12 and for properly aligning a slack adjuster 16 during a brake installation or replacement procedure. Specifically, the clevis alignment tool 50 is a template that may be incorporated into the cradle portion 30 of the measurement member 20 described above or by reorienting the cradle portion by 90 degrees as shown. More particularly, a wall of said cradle portion 30 may include opposed ends and may define a hole 52 centered between the opposed ends. Further, the wall may define a first notch 54 intermediate the hole 52 and one of said opposed ends and a second notch 56 intermediate the hole 52 and another of said opposed ends (FIG. 11). It is understood that the clevis alignment tool 50 may appear to be doubled or repeated in back-to-back alignments so as to work on either the left side or right side of the truck, in the manner described previously.

In addition, the present invention may include a slack adjuster alignment tool 60 (FIG. 12) having structures that enable proper alignment or setup of a slack adjuster 16 associated with the pushrod 12 length as discussed previously. The slack adjuster alignment tool 60 includes an upper end opposite a lower end and defines a body portion extending between the upper end and the lower end. The body portion defines a void 62 adjacent the lower end, the void 62 having a circular configuration for connection to the S-spline. Further, the body portion defines a plurality of holes 64 arranged in a linear configuration.

It is understood that while certain forms of this invention have been illustrated and described, it is not limited thereto except insofar as such limitations are included in the following claims and allowable functional equivalents thereof.

The invention claimed is:

1. A pushrod measurement and verification system for use in determining a correct length at which to sever a pushrod extending from a brake chamber so that a slack adjuster is properly mounted between a clevis and an S-cam shaft of an air brake system, said pushrod measurement system, comprising:

a measurement member having a body member that includes a lower end and an upper end opposite said lower end, said body member having a generally planar configuration;

wherein said body member defines at least one hole proximate said lower end of said body member and operable to receive the S-cam shaft;

a cradle portion mounted to said upper end of said body member, said cradle portion having a bottom wall and a pair of side walls extending upwardly from said bottom wall and defining an open top;

wherein said pair of side walls includes a front wall having measurement indicia thereon.

2. The pushrod measurement and verification system as in claim 1, wherein said at least one hole of said body member is a plurality of holes arranged in a linear pattern, each hole being separated from a next adjacent hole and associated with a size of a corresponding slack adjuster, respectively.

3. The pushrod measurement and verification system as in claim 1, further comprising indicia adjacent each hole of said plurality of holes and indicative of a size of a corresponding slack adjuster.

4. The pushrod measurement and verification system as in claim 3, wherein said plurality of holes and corresponding indicia are indicative of slack adjusters having a size of 5, 5½, 6, and 6½ inches, respectively.

5. The pushrod measurement and verification system as in claim 1, wherein said body member includes a primary portion defined by said lower end and said upper end and a bridge portion intermediate said upper end of said body member and said cradle portion, said bridge portion being offset from and perpendicular to said primary portion.

6. The pushrod measurement and verification system as in claim 1, wherein said pair of side walls are displaced from one another and said open top of said cradle is configured to receive the push rod therein in a nested configuration.

7. The pushrod measurement and verification system as in claim 1, further comprising a verification member that includes:
   a handle portion having a lower end and an upper end opposed to said lower end, said handle portion having a generally planar configuration;
   an alignment portion mounted to said upper end of said handle portion, said alignment portion having a bottom wall and a side wall extending upwardly from said bottom wall;
   wherein said side wall of said alignment portion defines first and second apertures that are spaced apart and operable to confirm proper installation of the clevis and the slack adjustor;
   wherein said verification member defines at least one hole proximate said lower end of said verification member and operable to receive the S-cam shaft.

8. The pushrod measurement and verification system as in claim 7, wherein said at least one hole of said verification member is a plurality of holes arranged in a vertical pattern, each hole being separated from a next adjacent hole in relation to a size of a corresponding slack adjuster, respectively.

9. The pushrod measurement and verification system as in claim 1, wherein said a wall of said cradle portion includes opposed ends and defines a hole centered between opposed ends of said opposed ends and defines a first notch intermediate said hole and one of said opposed ends and a second notch intermediate said hole and another of said opposed ends.

10. The pushrod measurement and verification system as in claim 9, further comprising a slack adjuster tool, comprising:
   an upper end opposite a lower end and defining body portion extending between said upper end and said lower end;
   wherein said body portion adjacent said lower end defines a void having a circular configuration that is operably coupled to the S-cam shaft;
   wherein said body portion adjacent said upper end defines at least one plurality of holes arranged in a linear arrangement.

11. A pushrod measurement and verification system for use in determining a correct length at which to sever a pushrod extending from a brake chamber so that a slack adjuster is properly mounted between a clevis and an S-cam shaft of an air brake system, said pushrod measurement system, comprising:
   providing a measurement member having a body member that includes a lower end and an upper end opposed to said lower end, said body member having a generally planar configuration;
   wherein said body member defines at least one hole proximate said lower end of said body member that is dimensioned to receive the S-cam shaft;
   receiving the S-cam shaft through said at least one hole of said body member;
   cradling the pushrod in a cradle portion of said measurement member, said cradle portion being mounted to said upper end of said body member and having a bottom wall and a pair of side walls extending upwardly from said bottom wall and defining an open top;
   wherein said pair of side walls includes a front wall having measurement indicia thereon;
   using said measurement markings, determining a cutback length of the pushrod cradled in said cradle portion.

12. The pushrod measurement and verification system as in claim 11, wherein said at least one hole of said body member is a plurality of holes arranged in a linear pattern, each hole being separated from a next adjacent hole and associated with a size of a corresponding slack adjuster, respectively.

13. The pushrod measurement and verification system as in claim 11, further comprising indicia adjacent each hole of said plurality of holes indicative of a size of a corresponding slack adjuster.

14. The pushrod measurement and verification system as in claim 13, wherein said plurality of holes and corresponding indicia are indicative of slack adjusters having a size of 5, 5½, 6, and 6½ inches, respectively.

15. The pushrod measurement and verification system as in claim 1, wherein said body member includes a primary portion defined by said lower end and said upper end and a bridge portion intermediate said upper end of said body member and said cradle portion, said bridge portion being offset from and perpendicular to said primary portion.

16. The pushrod measurement and verification system as in claim 1, wherein said pair of side walls are displaced from one another and said open top of said cradle is configured to receive the push rod therein.

17. The pushrod measurement and verification system as in claim 11, further comprising the step of verifying, by using a verification member, that the pushrod has been cut correctly, wherein said verification member includes:
   a handle portion having a lower end and an upper end opposed to said lower end, said handle portion having a generally planar configuration;
   an alignment portion mounted to said upper end of said handle portion, said alignment portion having a bottom wall and a side wall extending upwardly from said bottom wall;
   wherein said side wall of said alignment portion defines first and second apertures that are spaced apart and operable to confirm proper installation of the clevis and the slack adjustor;
   wherein said verification member defines at least one hole proximate said lower end of said verification member and operable to receive the S-cam shaft.

18. The pushrod measurement and verification system as in claim 17, wherein said at least one hole of said verification member is a plurality of holes arranged in a linear pattern, each hole being separated from a next adjacent hole in relation to a size of a corresponding slack adjuster, respectively.

19. The pushrod measurement and verification system as in claim 11, wherein said bottom wall of said cradle portion includes opposed ends and defines a hole centered between opposed ends of said opposed ends and defines a first notch intermediate said hole and one of said opposed ends and a second notch intermediate said hole and another of said opposed ends.

20. The pushrod measurement and verification system as in claim 11, further comprising providing a slack adjuster tool, comprising:
- an upper end opposite a lower end and defining body portion extending between said upper end and said lower end;
- wherein said body portion adjacent said lower end defines a void having a circular configuration that is operably coupled to the S-cam shaft;
- wherein said body portion adjacent said upper end defines at least one plurality of holes arranged in a single-file line.

\* \* \* \* \*